US011159335B2

(12) United States Patent
Shukla et al.

(10) Patent No.: US 11,159,335 B2
(45) Date of Patent: Oct. 26, 2021

(54) CONTROLLER-BASED MANAGEMENT OF NONCOMPLIANT POWER OVER ETHERNET DEVICES

(71) Applicant: Cisco Technology, Inc., San Jose, CA (US)

(72) Inventors: Amitesh Shukla, San Ramon, CA (US); Jigar Amin, Santa Clara, CA (US); Manish Jhanji, Santa Clara, CA (US); Rakesh Mishra, Milpitas, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 92 days.

(21) Appl. No.: 16/533,151

(22) Filed: Aug. 6, 2019

(65) Prior Publication Data

US 2021/0044444 A1    Feb. 11, 2021

(51) Int. Cl.
*G06F 1/3206* (2019.01)
*H04L 12/10* (2006.01)
*G06F 1/28* (2006.01)

(52) U.S. Cl.
CPC ............... *H04L 12/10* (2013.01); *G06F 1/28* (2013.01); *G06F 1/3206* (2013.01)

(58) Field of Classification Search
CPC ........... H04L 12/10; G06F 1/28; G06F 1/3206
See application file for complete search history.

(56) References Cited

U.S. PATENT DOCUMENTS

| 9,024,473 | B2 | 5/2015 | Huff et al. | |
| 9,164,558 | B2 | 10/2015 | Jain et al. | |
| 9,769,090 | B2 | 9/2017 | Stanford et al. | |
| 10,248,178 | B2 | 4/2019 | Brooks et al. | |
| 2014/0278248 | A1* | 9/2014 | Whittle | G05B 23/0283 |
| | | | | 702/184 |
| 2015/0035365 | A1 | 2/2015 | Picard et al. | |
| 2018/0150127 | A1* | 5/2018 | Wendt | G06F 1/266 |
| 2018/0340840 | A1* | 11/2018 | Bullock | H04L 12/40045 |

* cited by examiner

*Primary Examiner* — Gary Collins
(74) *Attorney, Agent, or Firm* — Polsinelli PC (57) ABSTRACT

Systems and methods provide for managing a power consumption policy for a powered device. A network controller may be configured to receive power consumption information for a powered device (PD) connected to power sourcing equipment (e.g., a PSE device), calculate a predicted threshold for the PD based on the power consumption information for the PD, and transmit the predicted threshold for the PD to the PSE device. Power sourcing equipment is configured to calculate power consumption information for the PD, transmit the power consumption information for the PD to the network controller, receive a predicted threshold for the PD, and implement a power consumption policy for the PD based on the predicted threshold.

20 Claims, 7 Drawing Sheets

| Day | Time | Current Threshold | Actual Consumption | Maximum | Device ID | Month | Year |
|---|---|---|---|---|---|---|---|
| Monday | 1 pm | 44W | 41W | 45W | Dev1 | Jan | 2018 |
| Monday | 12:45 am | 30W | Overdraw detect | 45W | Dev1 | Jan | 2018 |
| Thursday | 9:30 am | 43W | 40.2 W | 45W | Dev1 | Jan | 2018 |
| Tuesday | 11:20 pm | 34W | 33.5W | 45W | Dev1 | Feb | 2019 |

FIG. 7B

CONTROLLER-BASED MANAGEMENT OF NONCOMPLIANT POWER OVER ETHERNET DEVICES

TECHNICAL FIELD

The subject matter of this disclosure relates in general to the field of computer networking, and more particularly, to systems and methods for improving the operation of an enterprise network.

BACKGROUND

Various Power over Ethernet (PoE) systems are configured to transfer power from power sourcing equipment (PSE) to one or more powered devices (PDs). Power sourcing equipment are devices that provide power over a communications line such as an Ethernet cable. PSEs may include network switches or intermediate devices that sit between a non-PoE capable switch and a PD. Powered devices are any electronic devices that are powered by a PSE. Example PDs include wireless access points, voice over internet protocol (VoIP) phones, internet protocol (IP) cameras, light emitting diode (LED) lights, Internet of Things (IoT) devices, etc. In an example implementation, a category 5 cable may include four twisted pairs of wire. PoE uses one or two of the twisted pairs to provide power to connected devices. PoE therefore facilitates the use of a single cable to provide both data connection and electric power to devices.

The IEEE (Institute of Electrical and Electronics Engineers) 802.3 standard provides for signaling between the power sourcing equipment (PSE) and powered device (PD). This signaling facilitates the detection of a connected PD by the PoE, and serves as a medium by which the PD and PoE negotiate the amount of power required or available.

BRIEF DESCRIPTION OF THE FIGURES

To provide a more complete understanding of the present disclosure and features and advantages thereof, reference is made to the following description, taken in conjunction with the accompanying drawings, in which.

DESCRIPTION OF EXAMPLE EMBODIMENTS

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

Systems and methods provide for determining a predicted threshold for the one or more PoE devices. A system may be configured to perform a method including receiving, at a network controller from one or more network fabric edge nodes, operation data for one or more Power over Ethernet (PoE) powered devices (PDs), wherein the operation data includes power consumption information of the one or more Power over Ethernet (PoE) powered devices (PDs), generating a model based on the power consumption information for the one or more PoE powered devices, calculating a predicted threshold for the one or more PoE devices based on the model, and transmitting, to the one or more network fabric edge nodes, the predicted threshold for the one or more PoE devices, wherein the predicted threshold is used to implement a power consumption policy for the one or more PoE devices on the one or more network fabric edge nodes.

EXAMPLE EMBODIMENTS

Power over Ethernet (PoE) systems are configured to transfer power from power sourcing equipment (PSE) to one or more powered devices (PDs). However, the amount of power that a PSE can provide is limited and each PD may consume a different amount of power, which may vary over time. If the total draw from the PD devices connected to a PSE exceeds the amount of power that the PSE is able to provide, operation of the PSE and/or the amount of power that can be delivered by the PSE to the PDs may be adversely affected. This may in turn cause the degraded operation of the PDs either because of a loss of power provided by the PSE, a loss of connectivity provided by the PSE, or both. For example, one common response of a PSE is to cut power to a PD if the total power draw of the PD exceeds a set threshold either individually or as a group. This causes one or more of the PDs connected to a PSE to shut down. This result is especially bad when a PD is a critical piece of equipment.

The IEEE (Institute of Electrical and Electronics Engineers) 802.3 standards try to prevent PD devices from overdrawing power from a PSE by providing a signaling and control protocol between the PSE and the PDs. This signaling facilitates the detection of a connected PD by the PoE, and serves as a medium by which the PD and PoE negotiate the amount of power required or available. However, for a variety of different reasons, many PDs do not conform to the IEEE standards. These non-conforming PDs may exceed the threshold amount of power allowed by the PSE and cause the PSE, the PD, or other PDs connected to the PSE to experience various problems.

Furthermore, in many cases, the IEEE signaling and control protocols are sub-optimal and may not be efficient.

For example, many PoE implementations use various configured values such as Icut, Ilim, and Imin. Icut represents a level beyond which power consumption by a PD is regarded as an overload and will result in power to the PD being cut by the PSE. Ilim represents the highest consumption level possible. Imin is the minimal consumption level permitted. If a threshold power draw level (e.g., the Icut value) set by a PSE for a PD device is too high, there is wasted capacity that could have been directed to one or more other PDs. If the threshold power draw set by the PSE for the device is too low, the PD may exceed the threshold, which may cause issues for the PSE, the PD, or other PDs connected to the PSE.

Aspects of the subject technology address these and other technical problems by calculating a predicted threshold for a PD device. The predicted threshold may be calculated based on operation data for one or more PDs, which includes power consumption information. The operational data may be collected by a network controller from one or more nodes (e.g., PSEs, switches, routers, etc.) so as to remove the computational burdens from a PSE. The network controller may calculate the predicted threshold and transmit the predicted threshold to one or more PSEs for implementation.

According to some embodiments, various machine learning techniques may be used to calculate the predicted thresholds. By collecting the operational data at a centralized network controller, operational data from multiple environments, PSEs, nodes, and scenarios may be collected in order to improve the calculation of the prediction threshold. In many cases, a network controller may have more memory, processing power, and other computing resources necessary to implement these machine learning techniques, which may not be feasible using only PSEs.

The network controller may reside in, for example, a campus network. A campus network is configured to provide connectivity to computing devices (e.g., servers, workstations, desktop computers, laptop computers, tablets, mobile phones, etc.) and things (e.g., desk phones, security cameras, lighting, heating, ventilating, and air-conditioning (HVAC), windows, doors, locks, medical devices, industrial and manufacturing equipment, etc.) within environments such as homes, offices, hospitals, colleges and universities, oil and gas facilities, factories, and similar locations. Some of the unique challenges a campus network may face include integrating wired and wireless devices, on-boarding computing devices and things that can appear anywhere in the network and maintaining connectivity when the devices and things migrate from location to location within the network, supporting bring your own device (BYOD) capabilities, connecting and powering Internet-of-Things (IoT) devices, and securing the network despite the vulnerabilities associated with Wi-Fi access, device mobility, BYOD, and IoT.

Figure 1:
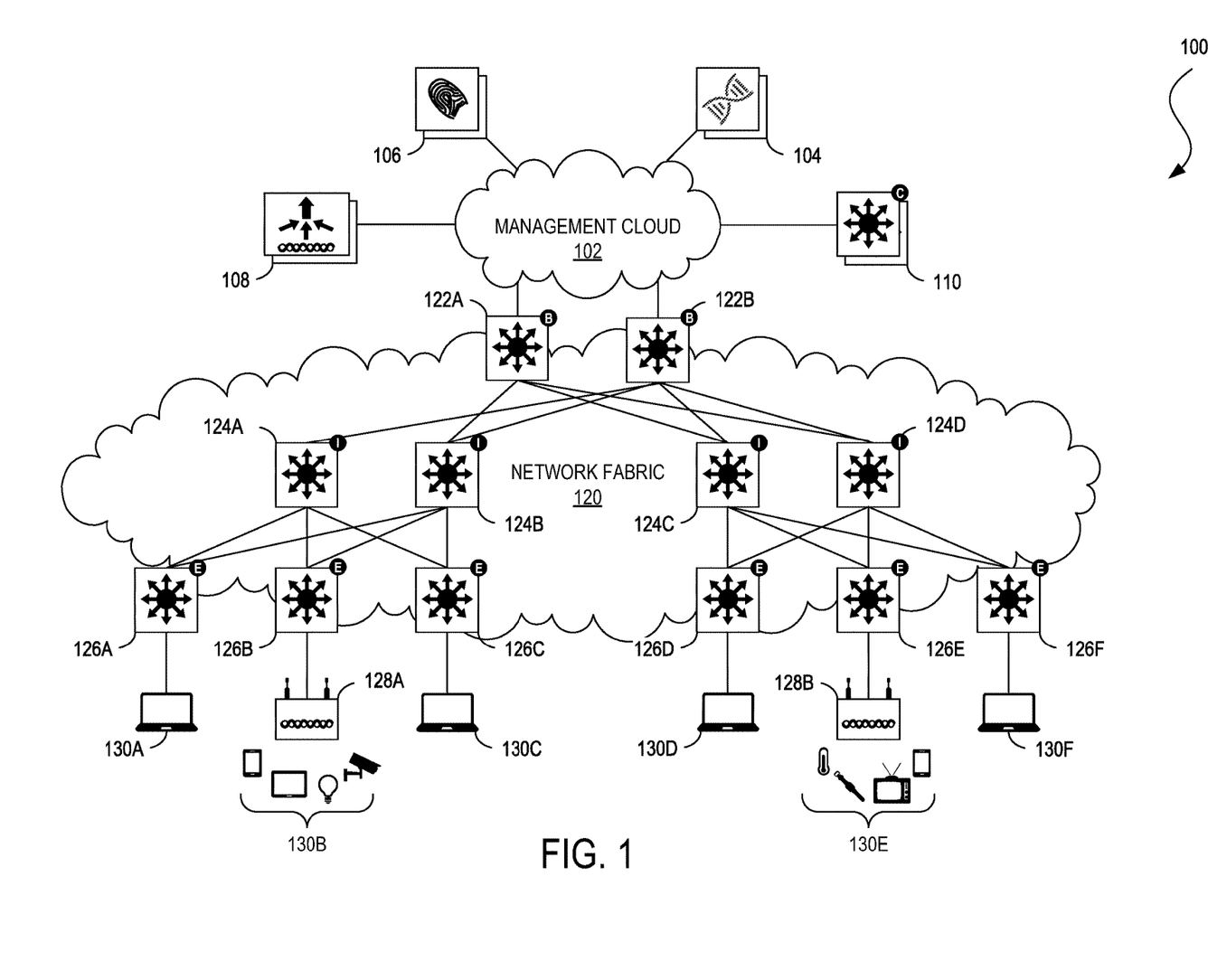
FIG. 1 illustrates an example of a physical topology of a campus network, in accordance with various aspects of the subject technology.

FIG. 1 illustrates an example of a physical topology of a campus network, in accordance with various aspects of the subject technology. In the example of FIG. 1, the campus network is in the form of enterprise network 100. It should be understood that, for the enterprise network 100 and any network discussed herein, there can be additional or fewer nodes, devices, links, networks, or components in similar or alternative configurations. Example embodiments with different numbers and/or types of endpoints, nodes, cloud components, servers, software components, devices, virtual or physical resources, configurations, topologies, services, appliances, or deployments are also contemplated herein. Further, the enterprise network 100 can include any number or type of resources, which can be accessed and utilized by endpoints or network devices. The illustrations and examples provided herein are for clarity and simplicity.

In this example, the enterprise network 100 includes a management cloud 102 and a network fabric 120. Although shown as an external network or cloud to the network fabric 120 in this example, the management cloud 102 may alternatively or additionally reside on the premises of an organization or in a colocation center (in addition to being hosted by a cloud provider or similar environment). The management cloud 102 can provide a central management plane for building and operating the network fabric 120. The management cloud 102 can be responsible for forwarding configuration and policy distribution, as well as device management and analytics. The management cloud 102 can comprise one or more network controller appliances 104, one or more authentication, authorization, and accounting (AAA) appliances 106, one or more wireless local area network controllers (WLCs) 108, and one or more fabric control plane nodes 110. In other embodiments, one or more elements of the management cloud 102 may be co-located with the network fabric 120.

The network controller appliance(s) 104 can function as the command and control system for one or more network fabrics, and can house automated workflows for deploying and managing the network fabric(s). The network controller appliance(s) 104 can include automation, design, policy, provisioning, and assurance capabilities, among others, as discussed further below with respect to FIG. 2. In some embodiments, one or more Cisco Digital Network Architecture (Cisco DNA™) appliances can operate as the network controller appliance(s) 104.

The AAA appliance(s) 106 can control access to computing resources, facilitate enforcement of network policies, audit usage, and provide information necessary to bill for services. The AAA appliance can interact with the network controller appliance(s) 104 and with databases and directories containing information for users, devices, things, policies, billing, and similar information to provide authentication, authorization, and accounting services. In some embodiments, the AAA appliance(s) 106 can utilize Remote Authentication Dial-In User Service (RADIUS) or Diameter to communicate with devices and applications. In some embodiments, one or more Cisco® Identity Services Engine (ISE) appliances can operate as the AAA appliance(s) 106.

The WLC(s) 108 can support fabric-enabled access points attached to the network fabric 120, handling traditional tasks associated with a WLC as well as interactions with the fabric control plane for wireless endpoint registration, and roaming. In some embodiments, the network fabric 120 can implement a wireless deployment that moves data-plane termination (e.g., VXLAN) from a centralized location (e.g., with previous overlay Control and Provisioning of Wireless Access Points (CAPWAP) deployments) to an access point/fabric edge node. This can enable distributed forwarding and distributed policy application for wireless traffic while retaining the benefits of centralized provisioning and administration. In some embodiments, one or more Cisco® Wireless Controllers, Cisco® Wireless LAN, and/or other Cisco DNA™-ready wireless controllers can operate as the WLC(s) 108.

The network fabric 120 can comprise fabric border nodes 122A and 122B (collectively, 122), fabric intermediate nodes 124A-D (collectively, 124), and fabric edge nodes 126A-F (collectively, 126). Although the fabric control plane node(s) 110 are shown to be external to the network fabric 120 in this example, in other embodiments, the fabric control plane node(s) 110 may be co-located with the network fabric 120. In embodiments where the fabric control plane node(s) 110 are co-located with the network fabric 120, the fabric control plane node(s) 110 may comprise a dedicated node or set of nodes or the functionality of the fabric control node(s) 110 may be implemented by the fabric border nodes 122.

The fabric control plane node(s) 110 can serve as a central database for tracking all users, devices, and things as they attach to the network fabric 120, and as they roam around. The fabric control plane node(s) 110 can allow network infrastructure (e.g., switches, routers, WLCs, etc.) to query the database to determine the locations of users, devices, and things attached to the fabric instead of using a flood and learn mechanism. In this manner, the fabric control plane node(s) 110 can operate as a single source of truth about where every endpoint attached to the network fabric 120 is located at any point in time. In addition to tracking specific endpoints (e.g., /32 address for IPv4, /128 address for IPv6, etc.), the fabric control plane node(s) 110 can also track larger summarized routers (e.g., IP/mask). This flexibility can help in summarization across fabric sites and improve overall scalability.

The fabric border nodes 122 can connect the network fabric 120 to traditional Layer 3 networks (e.g., non-fabric networks) or to different fabric sites. The fabric border nodes 122 can also translate context (e.g., user, device, or thing mapping and identity) from one fabric site to another fabric site or to a traditional network. When the encapsulation is the same across different fabric sites, the translation of fabric context is generally mapped 1:1. The fabric border nodes 122 can also exchange reachability and policy information with fabric control plane nodes of different fabric sites. The fabric border nodes 122 also provide border functions for internal networks and external networks. Internal borders can advertise a defined set of known subnets, such as those leading to a group of branch sites or to a data center. External borders, on the other hand, can advertise unknown destinations (e.g., to the Internet similar in operation to the function of a default route).

The fabric intermediate nodes 124 can operate as pure Layer 3 forwarders that connect the fabric border nodes 122 to the fabric edge nodes 126 and provide the Layer 3 underlay for fabric overlay traffic.

The fabric edge nodes 126 can connect endpoints to the network fabric 120 and can encapsulate/decapsulate and forward traffic from these endpoints to and from the network fabric. The fabric edge nodes 126 may operate at the perimeter of the network fabric 120 and can be the first points for attachment of users, devices, and things and the implementation of policy. In some embodiments, the network fabric 120 can also include fabric extended nodes (not shown) for attaching downstream non-fabric Layer 2 network devices to the network fabric 120 and thereby extend the network fabric. For example, extended nodes can be small switches (e.g., compact switch, industrial Ethernet switch, building automation switch, etc.) which connect to the fabric edge nodes via Layer 2. Devices or things connected to the fabric extended nodes can use the fabric edge nodes 126 for communication to outside subnets. In the example of FIG. 1, the network fabric can represent a single fabric site deployment. However, other implementations of the network fabric may include a multi-site fabric deployment.

The enterprise network 100 can also include wired endpoints 130A, 130C, 130D, and 130F and wireless endpoints 130B and 130E (collectively, 130). The wired endpoints 130A, 130C, 130D, and 130F can connect by wire to fabric edge nodes 126A, 126C, 126D, and 126F, respectively, and the wireless endpoints 130B and 130E can connect wirelessly to wireless access points 128B and 128E (collectively, 128), respectively, which in turn can connect by wire to fabric edge nodes 126B and 126E, respectively. In some embodiments, Cisco Aironet® access points, Cisco Meraki® MR access points, and/or other Cisco DNA™-ready access points can operate as the wireless access points 128.

The endpoints 130 can include general purpose computing devices (e.g., servers, workstations, desktop computers, etc.), mobile computing devices (e.g., laptops, tablets, mobile phones, etc.), wearable devices (e.g., watches, glasses or other head-mounted displays (HMDs), ear devices, etc.), and so forth. The endpoints 130 can also include Internet of Things (IoT) devices or equipment, such as agricultural equipment (e.g., livestock tracking and management systems, watering devices, unmanned aerial vehicles (UAVs), etc.); connected cars and other vehicles; smart home sensors and devices (e.g., alarm systems, security cameras, lighting, appliances, media players, HVAC equipment, utility meters, windows, automatic doors, door bells, locks, etc.); office equipment (e.g., desktop phones, copiers, fax machines, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, point of sale (POS) devices, Radio Frequency Identification (RFID) tags, etc.); smart city devices (e.g., street lamps, parking meters, waste management sensors, etc.); transportation and logistical equipment (e.g., turnstiles, rental car trackers, navigational devices, inventory monitors, etc.); and so forth.

In some embodiments, the network fabric 120 can support wired and wireless access as part of a single integrated infrastructure such that connectivity, mobility, and policy enforcement behavior are similar or the same for both wired and wireless endpoints. This can bring a unified experience for users, devices, and things that is independent of the access media.

In integrated wired and wireless deployments, control plane integration can be achieved with the WLC(s) 108 notifying the fabric control plane node(s) 110 of joins, roams, and disconnects by the wireless endpoints 130 such that the fabric control plane node(s) can have connectivity information about both wired and wireless endpoints in the network fabric 120, and can serve as the single source of truth for endpoints connected to the network fabric. For data plane integration, the WLC(s) 108 can instruct the fabric wireless access points 128 to form a VXLAN overlay tunnel to their adjacent fabric edge nodes 126. The AP VXLAN tunnel can carry segmentation and policy information to and from the fabric edge nodes 126, allowing connectivity, and functionality identical or similar to that of a wired endpoint. When the wireless endpoints 130 join the network fabric 120 via the fabric wireless access points 128, the WLC(s) 108 can onboard the endpoints into the network fabric 120 and inform the fabric control plane node(s) 110 of the endpoints' Media Access Control (MAC) addresses. The WLC(s) 108 can then instruct the fabric wireless access points 128 to form VXLAN overlay tunnels to the adjacent fabric edge nodes 126. Next, the wireless endpoints 130 can obtain IP addresses for themselves via Dynamic Host Configuration Protocol (DHCP). Once that completes, the fabric edge nodes 126 can register the IP addresses of the wireless endpoint 130 to the fabric control plane node(s) 110 to form a mapping between the endpoints' MAC and IP addresses, and traffic to and from the wireless endpoints 130 can begin to flow.

Figure 2:
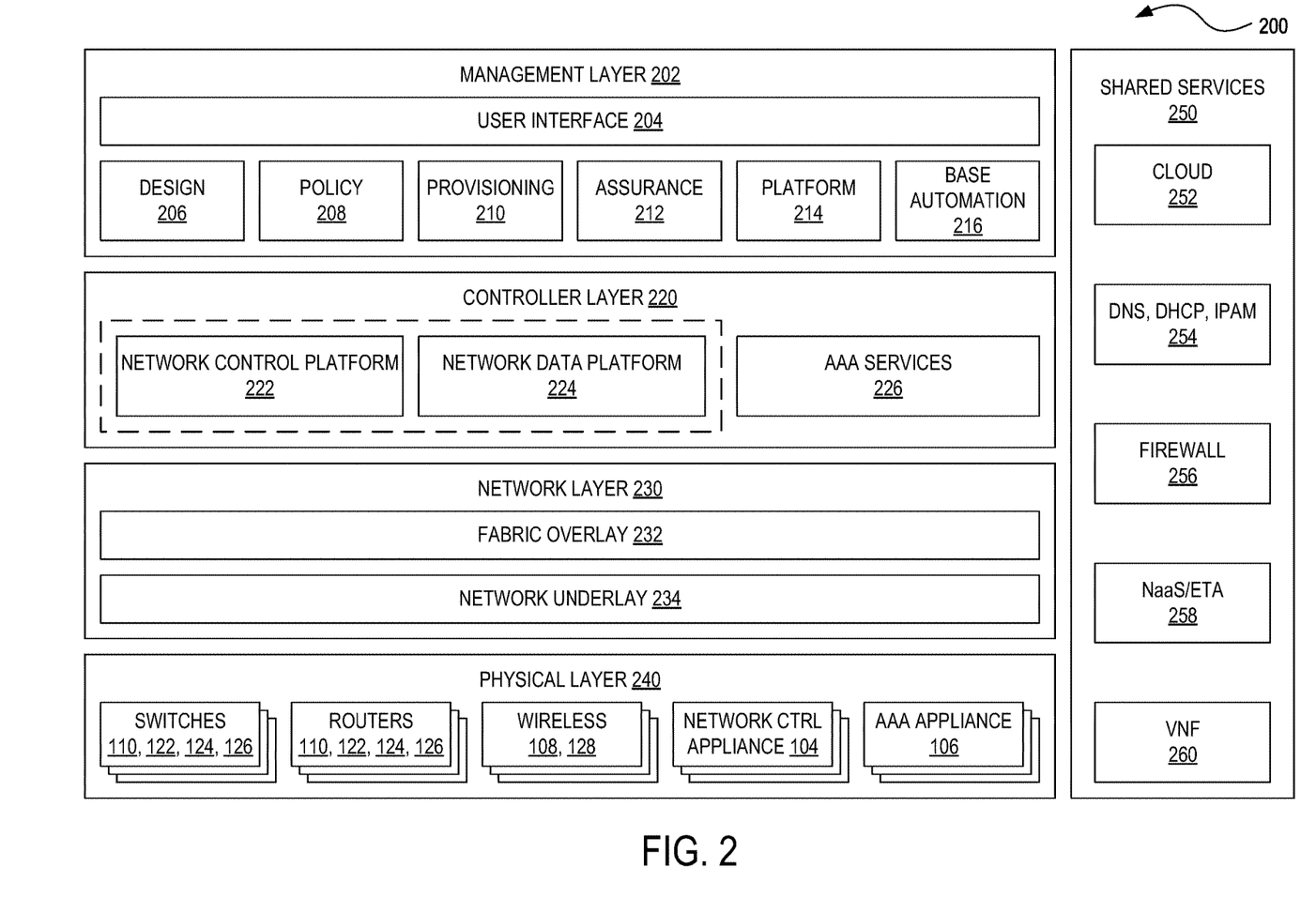
FIG. 2 illustrates an example of a logical architecture for a campus network such an enterprise network, in accordance with various aspects of the subject technology.

FIG. 2 illustrates an example of a logical architecture for a campus network such an enterprise network (e.g., the enterprise network 100 of FIG. 1), in accordance with various aspects of the subject technology. One of ordinary skill in the art will understand that, for the logical architecture 200 and any system discussed in the present disclosure, there can be additional or fewer component in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure. In this example, the logical architecture 200 includes a management layer 202, a controller layer 220, a network layer 230 (such as embodied by the network fabric 120), a physical layer 240 (such as embodied by the various elements of FIG. 1), and a shared services layer 250.

The management layer 202 can abstract the complexities and dependencies of other layers and provide a user with tools and workflows to manage an enterprise network (e.g., the enterprise network 100). The management layer 202 can include a user interface 204, design functions 206, policy functions 208, provisioning functions 210, assurance functions 212, platform functions 214, and base automation functions 216. The user interface 204 can provide a user a single point to manage and automate the network. The user interface 204 can be implemented within a web application/web server accessible by a web browser and/or an application/application server accessible by a desktop application, a mobile app, a shell program or other command line interface (CLI), an Application Programming Interface (e.g., restful state transfer (REST), Simple Object Access Protocol (SOAP), Service Oriented Architecture (SOA), etc.), and/or other suitable interface in which the user can configure network infrastructure, devices, and things that are cloud-managed; provide user preferences; specify policies, enter data; review statistics; configure interactions or operations; and so forth. The user interface 204 may also provide visibility information, such as views of a network, network infrastructure, computing devices, and things. For example, the user interface 204 can provide a view of the status or conditions of the network, the operations taking place, services, performance, a topology or layout, protocols implemented, running processes, errors, notifications, alerts, network structure, ongoing communications, data analysis, and so forth.

The design functions 206 can include tools and workflows for managing site profiles, maps and floor plans, network settings, and IP address management, among others. The policy functions 208 can include tools and workflows for defining and managing network policies. The provisioning functions 210 can include tools and workflows for deploying the network. The assurance functions 212 can use machine learning and analytics to provide end-to-end visibility of the network by learning from the network infrastructure, endpoints, and other contextual sources of information. The platform functions 214 can include tools and workflows for integrating the network management system with other technologies. The base automation functions 216 can include tools and workflows to support the policy functions 208, the provisioning functions 210, the assurance functions 212, and the platform functions 214.

In some embodiments, the design functions 206, the policy functions 208, the provisioning functions 210, the assurance functions 212, the platform functions 214, and the base automation functions 216 can be implemented as microservices in which respective software functions are implemented in multiple containers communicating with each rather than amalgamating all tools and workflows into a single software binary. Each of the design functions 206, policy functions 208, provisioning functions 210, assurance functions 212, and platform functions 214 can be viewed as a set of related automation microservices to cover the design, policy authoring, provisioning, assurance, and cross-platform integration phases of the network lifecycle. The base automation functions 214 can support the top-level functions by allowing users to perform certain network-wide tasks.

The controller layer 220 can comprise subsystems for the management layer 220 and may include a network control platform 222, a network data platform 224, and AAA services 226. These controller subsystems can form an abstraction layer to hide the complexities and dependencies of managing many network elements and protocols.

The network control platform 222 can provide automation and orchestration services for the network layer 230 and the physical layer 240, and can include the settings, protocols, and tables to automate management of the network and physical layers. For example, the network control platform 230 can provide the design functions 206, the provisioning functions 208 212. In addition, the network control platform 230 can include tools and workflows for discovering switches, routers, wireless controllers, and other network infrastructure devices (e.g., the network discovery tool 302); maintaining network and endpoint details, configurations, and software versions (e.g., the inventory management tool 304); Plug-and-Play (PnP) for automating deployment of network infrastructure (e.g., the network PnP tool 316), Path Trace for creating visual data paths to accelerate the troubleshooting of connectivity problems, Easy QoS for automating quality of service to prioritize applications across the network, and Enterprise Service Automation (ESA) for automating deployment of physical and virtual network services, among others. The network control platform 222 can communicate with network elements using Network Configuration (NETCONF)/Yet Another Next Generation (YANG), Simple Network Management Protocol (SNMP), Secure Shell (SSH)/Telnet, and so forth. In some embodiments, the Cisco® Network Control Platform (NCP) can operate as the network control platform 222

The network data platform 224 can provide for network data collection, analytics, and assurance, and may include the settings, protocols, and tables to monitor and analyze network infrastructure and endpoints connected to the network. The network data platform 224 can collect multiple types of information from network infrastructure devices, including syslog, SNMP, NetFlow, Switched Port Analyzer (SPAN), and streaming telemetry, among others. The network data platform 224 can also collect use contextual information shared from In some embodiments, one or more Cisco DNA™ Center appliances can provide the functionalities of the management layer 210, the network control platform 222, and the network data platform 224. The Cisco DNA™ Center appliances can support horizontal scalability by adding additional Cisco DNA™ Center nodes to an existing cluster; high availability for both hardware components and software packages; backup and store mechanisms to support disaster discovery scenarios; role-based access control mechanisms for differentiated access to users, devices, and things based on roles and scope; and programmable interfaces to enable integration with third party vendors. The Cisco DNA™ Center appliances can also be cloud-tethered to provide for the upgrade of existing functions and additions of new packages and applications without having to manually download and install them.

The AAA services 226 can provide identity and policy services for the network layer 230 and physical layer 240, and may include the settings, protocols, and tables to support endpoint identification and policy enforcement services. The AAA services 226 can provide tools and workflows to manage virtual networks and security groups, and to create group-based policies and contracts. The AAA services 226 can identify and profile network infrastructure devices and endpoints using AAA/RADIUS, 802.1X, MAC Authentication Bypass (MAB), web authentication, and EasyConnect, among others. The AAA services 226 can also collect and use contextual information from the network control platform 222, the network data platform 224, and the shared services 250, among others. In some embodiments, Cisco® ISE can provide the AAA services 226.

The network layer 230 can be conceptualized as a composition of two layers, an underlay 234 comprising physical and virtual network infrastructure (e.g., routers, switches, WLCs, etc.) and a Layer 3 routing protocol for forwarding traffic, and an overlay 232 comprising a virtual topology for logically connecting wired and wireless users, devices, and things and applying services and policies to these entities. Network elements of the underlay 234 can establish connectivity between each other, such as via Internet Protocol (IP). The underlay may use any topology and routing protocol.

In some embodiments, the network controller 104 can provide a local area network (LAN) automation service, such as implemented by Cisco DNA™ Center LAN Automation, to automatically discover, provision, and deploy network devices. Once discovered, the automated underlay provisioning service can leverage Plug and Play (PnP) to apply the required protocol and network address configurations to the physical network infrastructure. In some embodiments, the LAN automation service may implement the Intermediate System to Intermediate System (IS-IS) protocol. Some of the advantages of IS-IS include neighbor establishment without IP protocol dependencies, peering capability using loopback addresses, and agnostic treatment of IPv4, IPv6, and non-IP traffic.

The overlay 232 can be a logical, virtualized topology built on top of the physical underlay 234, and can include a fabric data plane, a fabric control plane, and a fabric policy plane. In some embodiments, the fabric data plane can be created via packet encapsulation using Virtual Extensible LAN (VXLAN) with Group Policy Option (GPO). Some of the advantages of VXLAN-GPO include its support for both Layer 2 and Layer 3 virtual topologies (overlays), and its ability to operate over any IP network with built-in network segmentation.

In some embodiments, the fabric control plane can implement Locator/ID Separation Protocol (LISP) for logically mapping and resolving users, devices, and things. LISP can simplify routing by removing the need for each router to process every possible IP destination address and route. LISP can achieve this by moving remote destination to a centralized map database that allows each router to manage only its local routs and query the map system to locate destination endpoints.

The fabric policy plane is where intent can be translated into network policy. That is, the policy plane is where the network operator can instantiate logical network policy based on services offered by the network fabric 120, such as security segmentation services, quality of service (QoS), capture/copy services, application visibility services, and so forth.

Segmentation is a method or technology used to separate specific groups of users or devices from other groups for the purpose of reducing congestion, improving security, containing network problems, controlling access, and so forth. As discussed, the fabric data plane can implement VXLAN encapsulation to provide network segmentation by using the virtual network identifier (VNI) and Scalable Group Tag (SGT) fields in packet headers. The network fabric 120 can support both macro-segmentation and micro-segmentation. Macro-segmentation logically separates a network topology into smaller virtual networks by using a unique network identifier and separate forwarding tables. This can be instantiated as a virtual routing and forwarding (VRF) instance and referred to as a virtual network (VN). That is, a VN is a logical network instance within the network fabric 120 defined by a Layer 3 routing domain and can provide both Layer 2 and Layer 3 services (using the VXLAN VNI to provide both Layer 2 and Layer 3 segmentation). Micro-segmentation logically separates user or device groups within a VN, by enforcing source to destination access control permissions, such as by using access control lists (ACLs). A scalable group is a logical object identifier assigned to a group of users, devices, or things in the network fabric 120. It can be used as source and destination classifiers in Scalable Group ACLs (SGACLs). The SGT can be used to provide address-agnostic group-based policies.

In some embodiments, the fabric control plane node 110 may implement the Locator/Identifier Separation Protocol (LISP) to communicate with one another and with the management cloud 102. Thus, the control plane nodes may operate a host tracking database, a map server, and a map resolver. The host tracking database can track the endpoints 130 connected to the network fabric 120 and associate the endpoints to the fabric edge nodes 126, thereby decoupling an endpoint's identifier (e.g., IP or MAC address) from its location (e.g., closest router) in the network.

The physical layer 240 can comprise network infrastructure devices, such as switches and routers 110, 122, 124, and 126 and wireless elements 108 and 128 and network appliances, such as the network controller appliance(s) 104, and the AAA appliance(s) 106.

The shared services layer 250 can provide an interface to external network services, such as cloud services 252; Domain Name System (DNS), DHCP, IP Address Management (IPAM), and other network address management services 254; firewall services 256; Network as a Sensor (Naas)/Encrypted Threat Analytics (ETA) services; and Virtual Network Functions (VNFs) 260; among others. The management layer 202 and/or the controller layer 220 can share identity, policy, forwarding information, and so forth via the shared services layer 250 using APIs.

Figure 3:
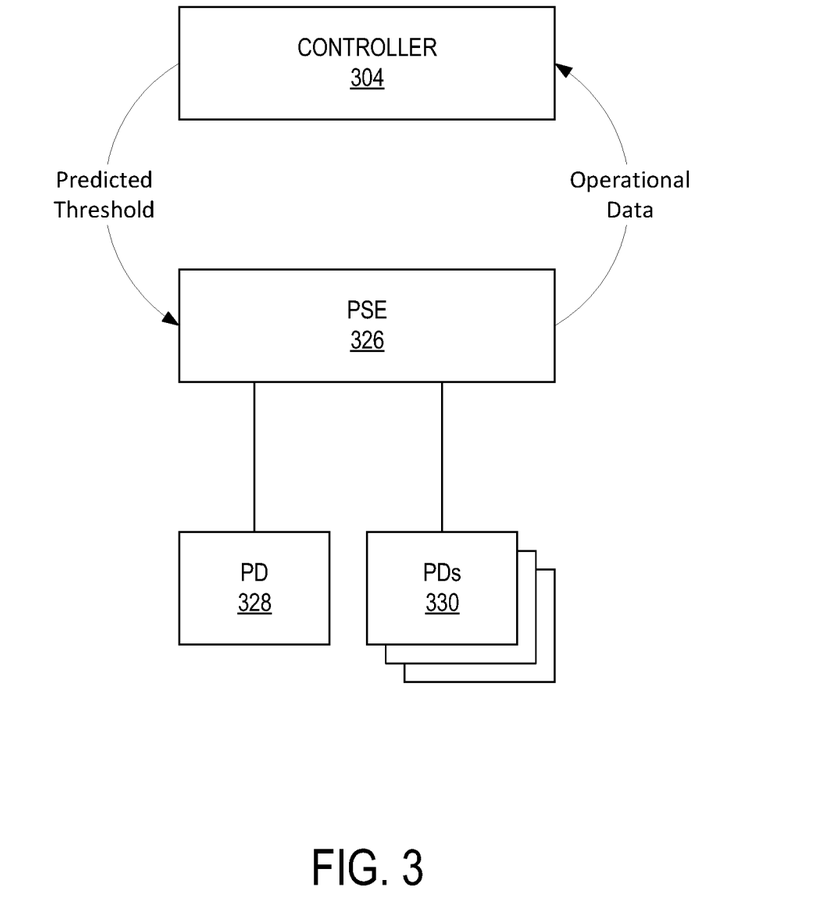
FIG. 3 is a diagram illustrating a network environment for managing PoE policies, in accordance with various aspects of the subject technology.

FIG. 3 is a diagram illustrating a network environment for managing PoE policies, in accordance with various aspects of the subject technology. FIG. 3 is shown for illustrative purposes and other configurations may also be used. For example, in some embodiments, power sourcing equipment (PSE) units or powered devices (PDs) may be used across one or more network fabrics. The network environment may include a controller 304, one or more power sourcing equipment (PSE) units 326, and one or more powered devices (PDs) 328 and 330.

The implementation of the PSE 326 may include a network switch or intermediate device (e.g., a power distribution hub) that sits between a non-PoE capable switch and a PD. In some embodiments, the PSE 326 may be a fabric edge node (e.g., a fabric edge node 126 of FIG. 1). The PDs 328 and 330 may include any electronic devices that are powered by a PSE. Example PDs include wireless access points (e.g., wireless access points 128 of FIG. 1), voice over internet protocol (VoIP) phones, internet protocol (IP) cameras, security devices (e.g., access control devices, sensors, alarms), light emitting diode (LED) lights, displays, computers (e.g., thin clients, laptops, desktops, etc.), point of sale devices, video conferencing devices, Internet of Things (IoT) devices, etc. The PDs 328 and 330 may be coupled to PSE 326 via a wire or cable configured to provide power to the PDs 328 and 330 and/or enable communications with the PDs 328 and 330. The wire may be, for example, an Ethernet wire such as a category 5 (Cat 5) cable.

The PSE 326 may be configured to collect operational data based on the operation of the PSE 326 and the devices connected to it (e.g., PDs 328 and 330) and transmit the operational data to the controller 304. The operational data may include, for example location information, information from sensors (e.g., temperature sensors, humidity sensors, light sensors, etc.) on or connected to the PSE 326, and/or computing resources used by the PSE 326 (e.g., processor load, bandwidth, memory, etc.). The operation data may also include power consumption data for the devices connected to it (e.g., PDs 328 and 330).

Figure 4:
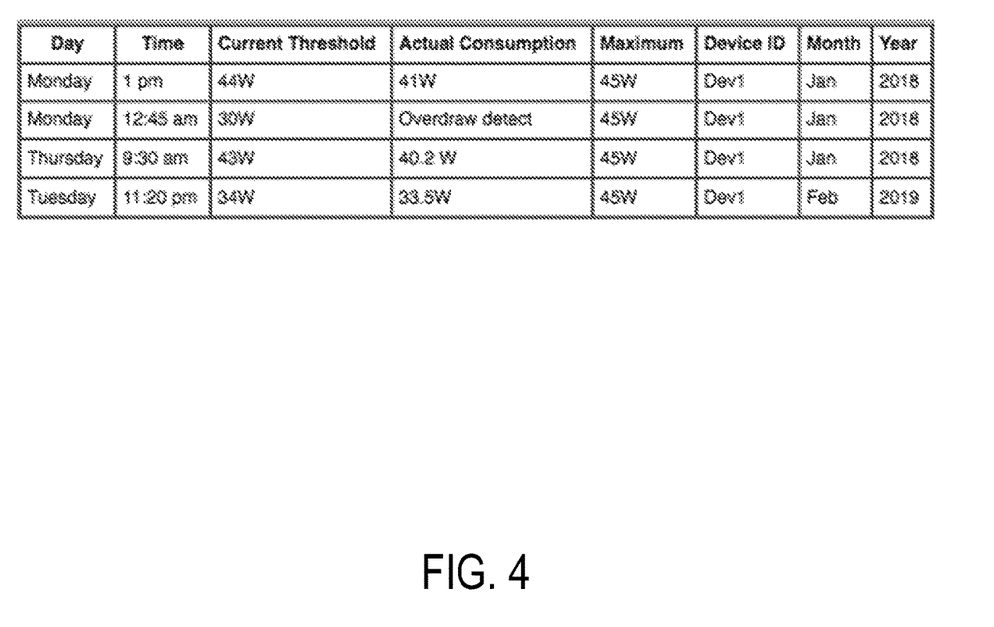
FIG. 4 is a chart illustrating example power consumption data, in accordance with various aspects of the subject technology.

FIG. 4 is a chart illustrating example power consumption data, in accordance with various aspects of the subject technology. For illustrative purposes, the chart of FIG. 4 is a visual representation of power consumption data generated by PSE 326 for one device (e.g., PD 328) with a device ID of "Dev1." PSE 326 may also generate similar power consumption data for other PDs connected to PSE 326 and drawing power from PSE 326. Furthermore, the chart of FIG. 4 displays an example set of power consumption data. Additional information or alternative information may also be collected.

The power consumption data collected by PSE 326 may include time series that includes a data identifier (e.g., a timestamp, a date, a time, a month, a year, a season, a tag, etc.), a current power threshold set for the device, in actual power consumption for the device, the maximum power draw for the device, and any other data associated with power consumption for the device. The power consumption data may be regularly collected by PSE 326 and transmitted to the controller 304 for storage and analysis. Although the chart in FIG. 4 includes a limited set of data, PSE 326 may continually monitor the power consumption of any device connected to it at regular intervals and continually generate power consumption data for the device.

The controller 304 may be implemented as one or more controller appliances (e.g., network controller appliances 104, wireless local area network controllers (WLCs) 108, or fabric control plane nodes 110 of FIG. 1). In some embodiments, the controller 304 may be a part of the same network fabric as the PSE 326, in a different network fabric, and/or be a service in a cloud network. In some cases, the controller 304 may be provided by a third-party service.

The controller 304 may receive operation data from the PSE 326. The operation data may include power consumption information of PDs 328 and 330 connected to the PSE 326. The power consumption information for each of the PDs 328 and 330 may include device information that enables the controller 304 to identify which device is associated with the power consumption information. For example, the device information may include one or more device identifiers (e.g., serial number, model number, manufacturer, software, firmware, or hardware version identifiers, MAC address, IP address, etc.), device types, categories, or subcategories, user identifiers (e.g., user name or account identifier), or other device identifying information.

Based on the power consumption information received from the PSE 326, the controller 304 can analyze the power consumption information and generate a predicted threshold for particular device. According to some embodiments, the controller 304 can generate a model and calculate a predicted threshold for the one or more of the PDs 328 and 330 based on the model. This analysis involves time series analysis of the temporal PD data. This is important because as described in above sections the power consumption could be temporal in nature for majority of the PoE devices. Things like day of the week, time of the day, month etc. seem to influence the power consumption by a PoE devices.

According to some embodiments, the controller 304 can use time forecasting models such as, for example, autoregressive (AR) models, integrated (I) models, moving average (MA) models, and/or combinations of these. For example, the controller may also use autoregressive moving average (ARMA), autoregressive conditional heteroskedasticity (ARCH) models, autoregressive integrated moving average (ARIMA) models, autoregressive fractionally integrated moving average (ARFIMA) models, Hidden Markov models (HMMs), Bayesian networks, or Recurrent Neural Networks (RNN). In some embodiments, other types of time series models may also be deployed based on various factors. These additional models may include seasonal naïve, support-vector machines (SVM), or Deep Learning Long short-term memory (LSTM) models.

In other embodiments, linear regression may be used when enough data for a PD does not show a lot of time-based variance. In some embodiments, an ensemble of both the models can be deployed. For example, the controller 304 may calculate a level of time-based variance for power consumption information associated with a particular PD. If the level of time-based variance is below a certain threshold level, linear regression may be used. If the level of time-based variance is above the threshold level, other models (e.g., ARIMA) may be used.

Once a predicted threshold is calculated for a particular device (e.g., PD 328), the controller 304 may transmit the predicted threshold to the PSE 326. The PSE 326 may receive the predicted threshold and use it to implement a power consumption policy for the device (e.g., PD 328). For example, the PSE 326 may set the power threshold of PD 328 to the received predicted threshold.

According to some embodiments, more advanced multivariate modeling can be done including additional temporal complex variables such as atmospheric temperature, humidity, computing resources used by the PSE 326, etc. According to some embodiments, the operational data received from the PSE 326 (e.g., from sensors and/or computing resources used by the PSE 326) may be used to calculate a predicted threshold for one or more devices. In other embodiments the additional information may be retrieved from one or more third-party services (e.g., a weather service, a date-and-time service, a news service, etc.).

In some cases, time series analysis of multi-year data of a specific type of device can result in a better predicted threshold as it might be hiding crucial seasonal information (monthly, quarterly, day of week, holiday season, etc.). For example, certain PDs (e.g., IP cameras with infrared capability) may be prone to draw relatively more power during winter months as compared to summer. To capture these potentially previously unknown relationships, time series analysis of the feature set is important.

According to some embodiments, the controller 304 may identify similar PDs (e.g., PDs 330) and group them together for analysis. For example, in some scenarios, the operation data from the PSE 326 and power consumption information for some PDs may include anomalies and be prone to error. Furthermore, generating models and predicted thresholds for each PD separately may require large amounts of computing resources and compute time. By grouping together similar PDs for analysis, the accuracy of predicted thresholds may be improved and/or the amount of computing resources needed to provide predicted thresholds to a large group of PDs may be reduced. Grouping similar devices can help avoid outliers and skew in the data which is being fed for the training.

According to some embodiments, the controller 304 may identify similar PDs based on the device information included in power consumption information. The device information may include one or more device identifiers (e.g., serial number, model number, manufacturer, software, firmware, or hardware version identifiers, MAC address, IP address, etc.), device types, categories, or subcategories, user identifiers (e.g., user name or account identifier), or other device identifying information. The controller 304 may also identify similar PDs based on similar power consumption patterns.

The controller 304 may use various models and techniques to identify similar PDs. For example, clustering techniques such as k-means or k-nearest-neighbors can be used to identify groupings of similar PDs based on device information and power consumption information provided by the one or more PSEs. Once a group of similar PDs (e.g., PDs 330) is identified, the controller 304 may analyze the power consumption information for the group and generate a predicted threshold for the group of similar devices (e.g., PDs 330). The predicted threshold may then be provided to PSEs that have similar devices connected to it and the PSEs may implement a power consumption policy each of the similar devices based on the predicted threshold.

In some scenarios, however, identifying similar devices based on device information (e.g., device identifiers or device types) may not be sufficiently accurate as some devices that may have the same or similar device identifiers and device types may be deployed in different environments, for different uses, or in different configurations. These differences may impact power consumption patterns for the devices and, as a result, the devices may benefit from having different predicted thresholds. To compensate for these differences, some embodiments also use deployment environment data as input into the clustering models. The deployment environment data may include, for example, average range of temperature in which the device operates, geographical location, humidity, most frequent type(s) of data being transmitted/received by the device (e.g., audio vs video), supported mode of operations, average duration of day and night at the location, or the like. This information may be received from the PDs themselves, the PSE connected to the PDs, or a third party. The information can be received from sensors, any third party database/applications providing relevant information.

Accordingly, aspects of the subject technology enable a network controller to manage an elastic power pool which can shrink and expand in an appropriate range without impacting powered up devices. This information can be used to dynamically update the threshold power draw level (e.g., the Icut value) or recommend the max or range of value to the administrator. This results in saved wattage that may be allocated to other devices and/or setting power consumption policies that enable more reliable and robust operation of the PSEs and/or PDs.

Figure 5:
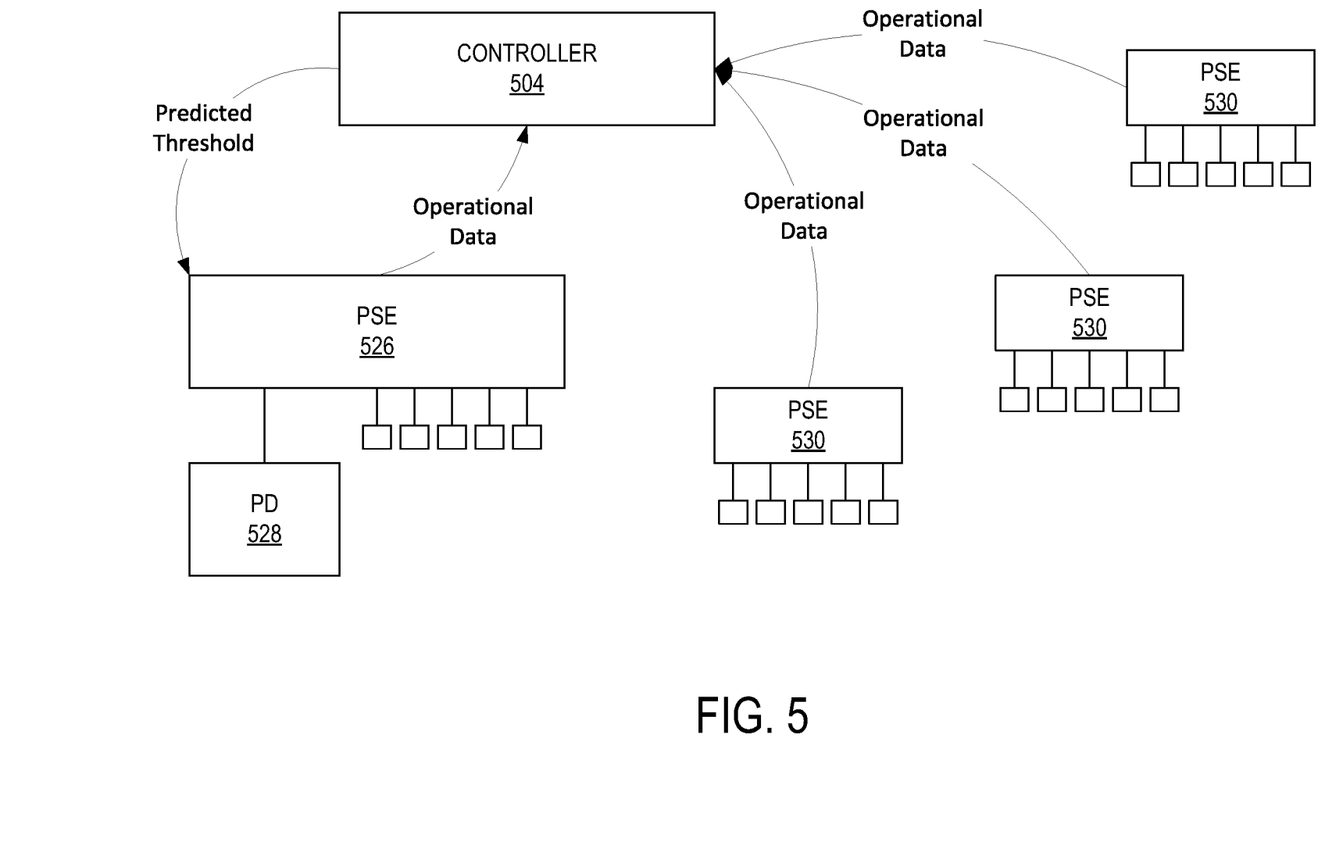
FIG. 5 is a diagram illustrating a network environment with multiple PSE units, in accordance with various aspects of the subject technology.

In some scenarios similar devices may not only reside on a single PSE. Accordingly, various aspects of the subject technology leverage the network environment to collect data from PSEs across the network environment. FIG. 5 is a diagram illustrating a network environment with multiple PSE units, in accordance with various aspects of the subject technology. FIG. 5 is shown for illustrative purposes and other configurations may also be used.

The network environment may include a controller 504, power sourcing equipment (PSE) units 526 and 530, and powered devices (PDs) connected to the PSE units 526 and 530. The PSE units 526 and 530 may be distributed across one or more network fabrics and are able to communicate with controller 504 over one or more networks. The PSE units 526 and 530 may be, for example, a network switch or other node in a network fabric of FIG. 1. The PDs may include any electronic devices that are powered by a PSE. Example PDs include wireless access points (e.g., wireless access points 128 of FIG. 1), routers or switches, antennas, voice over internet protocol (VoIP) phones, internet protocol (IP) cameras, security devices (e.g., access control devices, sensors, alarms), light emitting diode (LED) lights, displays, computers (e.g., thin clients, laptops, desktops, etc.), point of sale devices, video conferencing devices, Internet of Things (IoT) devices, etc.

The controller 504 may collect operational data associated with PSE units 526 and 530 and PDs across the network environment, identify groups of similar PDs, and generate predicted thresholds for any one or more groups of similar PDs. These predicted thresholds may be transmitted back to the PSE units 526 and 530 for implementing a power consumption policy.

For example each of the PSE units 526 and 530 may be configured to generate operational data based on their operation and the operation of the PDs connected to them. The operational data may include, for example location information, information from sensors (e.g., temperature sensors, humidity sensors, light sensors, etc.) on or connected to the PSE units, and/or computing resources used by the PSE units (e.g., processor load, bandwidth, memory, etc.). The operation data may also include power consumption data for the devices connected to it. The operational data may be periodically transmitted to the controller 504 for analysis.

The controller 504 may be implemented as one or more controller appliances (e.g., network controller appliances 104, wireless local area network controllers (WLCs) 108, or fabric control plane nodes 110 of FIG. 1). In some embodiments, the controller 504 may be a part of the same network fabric as the PSE 526, in a different network fabric, and/or be a service in a cloud network. The PSE units 526 and 530 may also be in the same network fabric or in different network fabrics.

The controller 504 may receive operation data from the PSE units 526 and 530. The operation data may include power consumption information, which may also include device information that enables the controller 504 to identify which device is associated with the power consumption information. Based on the power consumption information received from the PSE units 526 and 530, the controller 504 can analyze the power consumption information and generate a predicted threshold for particular device or group of devices. Once a predicted threshold is calculated, the controller 504 may transmit the predicted threshold to one or more of the PSE units 526 and 530. The PSE units 526 and 530 may receive the predicted threshold and use it to implement a power consumption policy.

Accordingly, a PSE (e.g., PSE 526) can receive a predicted threshold generated by the controller 504 based on operation data received from PSE units across one or more networks (e.g., PSE units 526 and 530). The predicted threshold may be generated for a group of similar PDs that may be identified by device identifiers and/or a device profile. The PSE (e.g., PSE 526) may determine whether the received predicted threshold applies to a PD in connection with the PSE based on the device identifiers and/or the device profile associated with the predicted threshold matching the device identifiers and/or the device profile of a PD in connection with the PSE. If there is a match for a PD (e.g., PD 528), The PSE (e.g., PSE 526) will implement a power consumption policy for the PD (e.g., PD 528) based on the predicted threshold.

Figure 6:
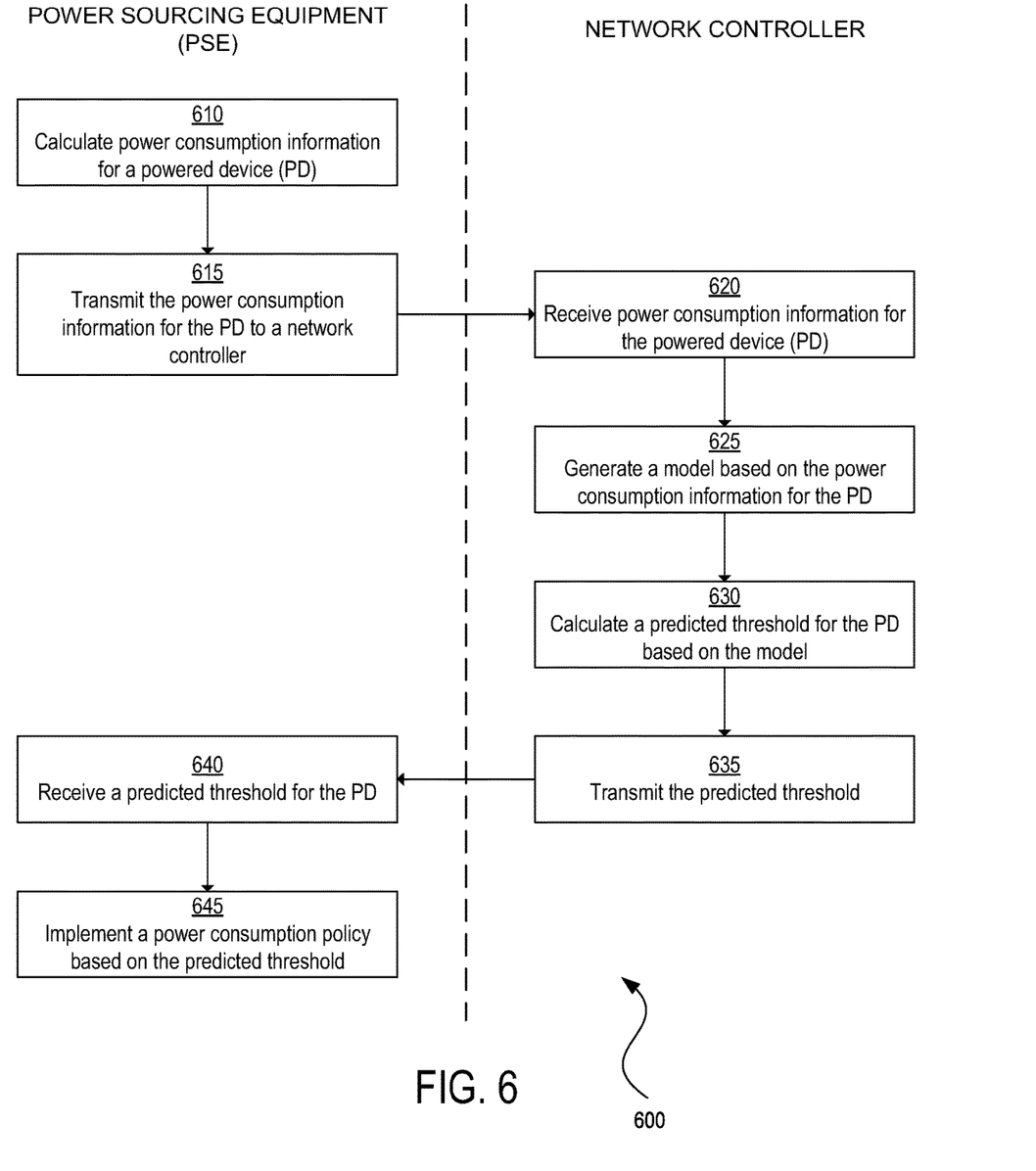
FIG. 6 is a flow diagram illustrating example methods for implementing a power consumption policy, in accordance with various aspects of the subject technology.

FIG. 6 is a flow diagram illustrating example methods 600 for implementing a power consumption policy, in accordance with various aspects of the subject technology. The operations of methods 600 presented below are intended to be illustrative. In some implementations, methods 600 may be accomplished with one or more additional operations not described, and/or without one or more of the operations discussed. Additionally, the order in which the operations of methods 600 are illustrated in FIG. 6 and described below is not intended to be limiting.

In some implementations, methods 600 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of methods 600 in response to instructions stored electronically on an electronic storage medium. The one or more processing devices may include one or more devices configured through hardware, firmware, and/or software to be specifically designed for execution of one or more of the operations of methods 600.

In FIG. 6, the methods 600 illustrated are performed by power sourcing equipment (PSE) and a network controller. However, other devices may also perform the methods. The power sourcing equipment may be a switch, router, edge node of a network fabric, or other suitable device. The network controller may be configured to communicate with the power sourcing equipment via a network. The network controller may be a part of the same network as the power sourcing equipment or a different network.

At operation 610, the PSE calculates power consumption information for one or more Power over Ethernet (PoE) powered devices (PDs) that are connected to the PSE and receive power from the PSE. At operation 615, the PSE transmits the power consumption information for the PD to the network controller. A number of PSE devices across one or more networks may generate power consumption information for PD devices and transmit the power consumption information to the network controller.

At operation 620, the network controller receives power consumption information for one or more PDs from one or more PSE devices and generates a model based on the power consumption information at operation 625. Based on the model, the network controller calculates a predicted threshold for the PD or a group of devices that are similar to the PD at operation 630. At operation 635, the network controller transmits the predicted threshold to one or more PSE devices for implementation.

At operation 640, the PSE receives the predicted threshold for the PD from the network controller and, at operation 645, implements a power consumption policy for the PD based on the predicted threshold.

According to some embodiments, the PSE and the network controller may coordinate to provide and/or implement power consumption policies for a specific subset of PDs connected to the PSE or ports of the PSE. The implementation of power consumption policies may follow an opt-in policy or an opt-out policy. For example, in some embodiments, a network administrator may specify using an interface for the PSE that one or more ports of the PSE or one or more PDs connected to the PSE are to have power consumption policies calculated for the ports or PDs based on the predicted thresholds provided by the network controller. In other embodiments, a network administrator may specify using an interface for the PSE that one or more ports or PDs are not to have power consumption policies calculated for the ports or PDs. Additionally or alternatively, the network administrators may specify port or PD inclusion or exclusion from automatically implementing a power consumption policy via an interface with the network controller.

Figure 7A:
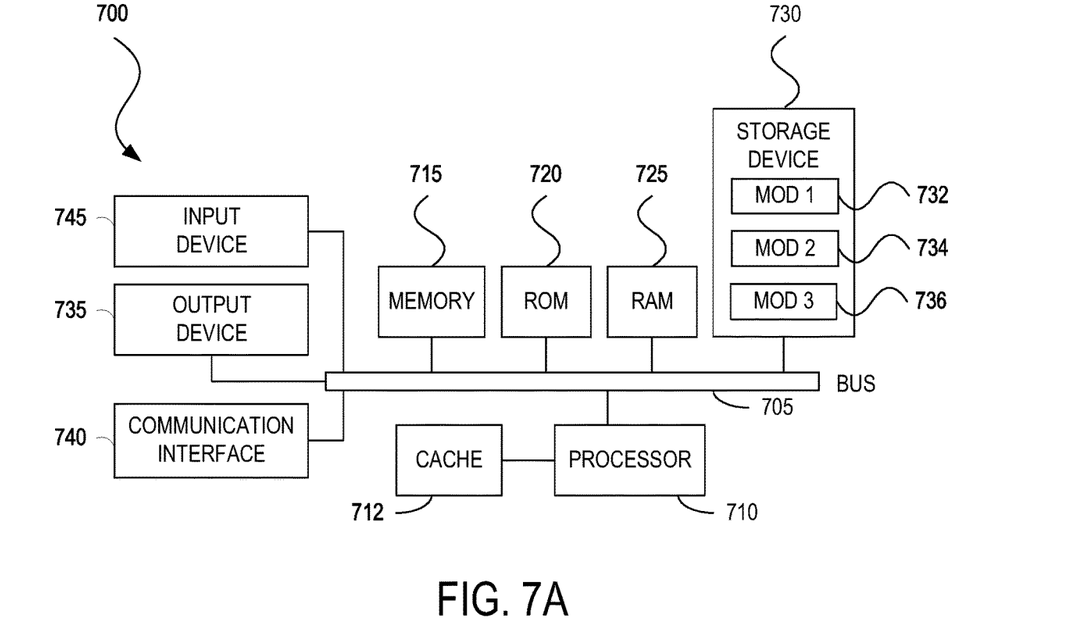
FIGS. 7A and 7B illustrate examples of systems in accordance with some embodiments.
Figure 7B:
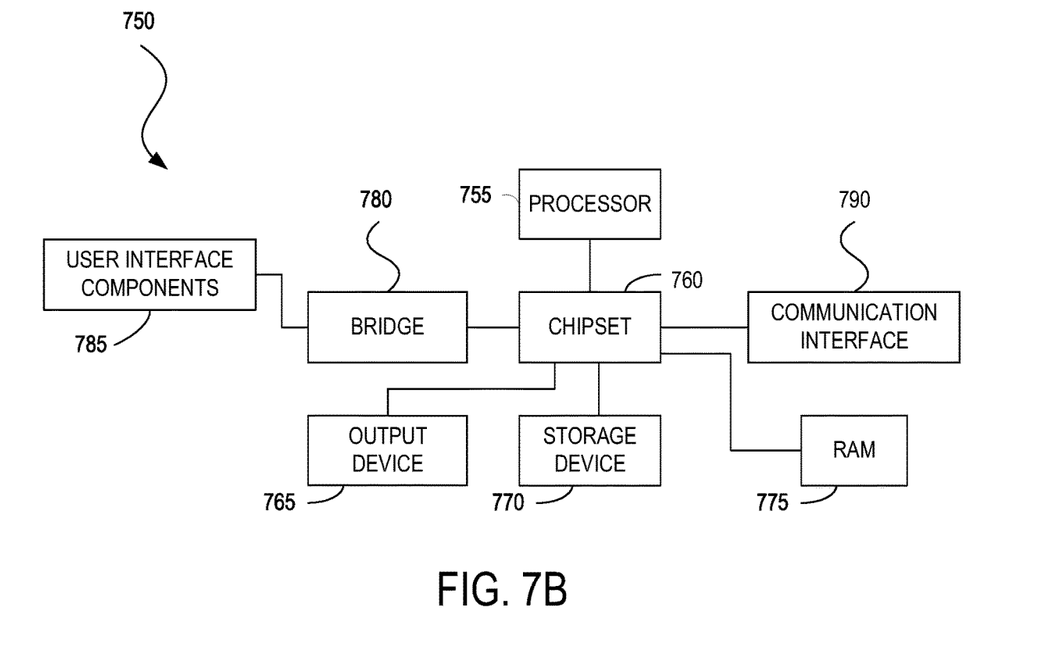

FIG. 7A and FIG. 7B illustrate systems in accordance with various embodiments. The more appropriate system will be apparent to those of ordinary skill in the art when practicing the various embodiments. Persons of ordinary skill in the art will also readily appreciate that other systems are possible.

FIG. 7A illustrates an example of a bus computing system 700 wherein the components of the system are in electrical communication with each other using a bus 705. The computing system 700 can include a processing unit (CPU or processor) 710 and a system bus 705 that may couple various system components including the system memory 715, such as read only memory (ROM) 720 and random access memory (RAM) 725, to the processor 710. The computing system 700 can include a cache 712 of high-speed memory connected directly with, in close proximity to, or integrated as part of the processor 710. The computing system 700 can copy data from the memory 715, ROM 720, RAM 725, and/or storage device 730 to the cache 712 for quick access by the processor 710. In this way, the cache 712 can provide a performance boost that avoids processor delays while waiting for data. These and other modules can control the processor 710 to perform various actions. Other system memory 715 may be available for use as well. The memory 715 can include multiple different types of memory with different performance characteristics. The processor 710 can include any general purpose processor and a hardware module or software module, such as module 1 732, module 2 734, and module 3 736 stored in the storage device 730, configured to control the processor 710 as well as a special-purpose processor where software instructions are incorporated into the actual processor design. The processor 710 may essentially be a completely self-contained computing system, containing multiple cores or processors, a bus, memory controller, cache, etc. A multi-core processor may be symmetric or asymmetric.

To enable user interaction with the computing system 700, an input device 745 can represent any number of input mechanisms, such as a microphone for speech, a touch-protected screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with the computing system 700. The communications interface 740 can govern and manage the user input and system output. There may be no restriction on operating on any particular hardware arrangement and therefore the basic features here may easily be substituted for improved hardware or firmware arrangements as they are developed.

The storage device 730 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, the storage device 730 can include the software modules 732, 734, 736 for controlling the processor 710. Other hardware or software modules are contemplated. The storage device 730 can be connected to the system bus 705. In some embodiments, a hardware module that performs a particular function can include a software component stored in a computer-readable medium in connection with the necessary hardware components, such as the processor 710, bus 705, output device 735, and so forth, to carry out the function.

FIG. 7B illustrates an example architecture for a chipset computing system 750 that can be used in accordance with an embodiment. The computing system 750 can include a processor 755, representative of any number of physically and/or logically distinct resources capable of executing software, firmware, and hardware configured to perform identified computations. The processor 755 can communicate with a chipset 760 that can control input to and output from the processor 755. In this example, the chipset 760 can output information to an output device 765, such as a display, and can read and write information to storage device 770, which can include magnetic media, solid state media, and other suitable storage media. The chipset 760 can also read data from and write data to RAM 775. A bridge 780 for interfacing with a variety of user interface components 785 can be provided for interfacing with the chipset 760. The user interface components 785 can include a keyboard, a microphone, touch detection and processing circuitry, a pointing device, such as a mouse, and so on. Inputs to the computing system 750 can come from any of a variety of sources, machine generated and/or human generated.

The chipset 760 can also interface with one or more communication interfaces 790 that can have different physical interfaces. The communication interfaces 790 can include interfaces for wired and wireless LANs, for broadband wireless networks, as well as personal area networks. Some applications of the methods for generating, displaying, and using the technology disclosed herein can include receiving ordered datasets over the physical interface or be generated by the machine itself by the processor 755 analyzing data stored in the storage device 770 or the RAM 775. Further, the computing system 750 can receive inputs from a user via the user interface components 785 and execute appropriate functions, such as browsing functions by interpreting these inputs using the processor 755.

It will be appreciated that computing systems 700 and 750 can have more than one processor 710 and 755, respectively, or be part of a group or cluster of computing devices networked together to provide greater processing capability.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Statements of the disclosure include:

Statement 1. A method comprising receiving, at a network controller from one or more network fabric edge nodes, operation data for one or more Power over Ethernet powered devices (PDs), wherein the operation data includes power consumption information of the one or more Power over Ethernet powered devices (PDs); generating a model based on the power consumption information for the one or more powered devices; calculating a predicted threshold for the one or more powered devices based on the model; and transmitting, to the one or more network fabric edge nodes, the predicted threshold for the one or more powered devices, wherein the predicted threshold is used to implement a power consumption policy for the one or more powered devices on the one or more network fabric edge nodes.

Statement 2. The method of statement 1, wherein the power consumption information for the one or more powered devices includes powered consumption information associated with a first set of powered devices connected to a first power sourcing equipment (PSE) device and powered consumption information associated with a second set of powered devices connected to a second power sourcing equipment (PSE) device.

Statement 3. The method of statements 1-2, wherein the one or more network fabric edge nodes include the first power sourcing equipment device and the second power sourcing equipment device.

Statement 4. The method of statements 1-3, wherein the model is an AutoRegressive Integrated Moving Average (ARIMA) model.

Statement 5. The method of statements 1-4, wherein the power consumption information of the one or more powered devices includes device information for each PD of the one or more Power over Ethernet powered devices (PDs).

Statement 6. The method of statements 1-5, further comprising identifying a set of similar devices based on device information for each PD of the one or more Power over Ethernet powered devices (PDs); and wherein the predicted threshold is for the set of similar devices.

Statement 7. The method of statements 1-6, wherein the set of similar devices is identified based on a clustering technique.

Statement 8. The method of statements 1-7, wherein the operation data further includes sensor data associated with a network fabric edge node of the one or more network fabric edge nodes; and wherein the set of similar devices is identified based on the sensor data.

Statement 9. The method of statements 1-8, wherein the operation data further includes location data associated with a network fabric edge node of the one or more network fabric edge nodes, the method further comprising retrieving weather data from a third party service based on the location data; and wherein the set of similar devices is identified based on the weather data.

Statement 10. The method of statements 1-9, wherein the one or more powered devices include at least one of an Internet Protocol (IP) camera, Voice-over-Internet-Protocol (VoIP) phone, or a wireless access point.

Statement 11. A non-transitory computer-readable medium comprising instructions that, when executed by one or more processors, cause a computing device to receive, at a controller from a power sourcing equipment (PSE) device, power consumption information for a powered device (PD) connected to the PSE device via cabling; calculate a predicted threshold for the powered device based on the power consumption information for the powered device; and transmit, via a network to the PSE device, the predicted threshold for the powered device, wherein the PSE device is configured to implement a power consumption policy for the PD based on the predicted threshold.

Statement 12. The non-transitory computer-readable medium of statement 11, wherein the predicted threshold is calculated based on an AutoRegressive Integrated Moving Average (ARIMA) model.

Statement 13. The non-transitory computer-readable medium of statements 11-12, wherein the cabling is an Ethernet cable.

Statement 14. A power sourcing equipment (PSE) device comprising one or more processors; and at least one non-transitory computer-readable medium having stored therein instructions. The instructions, when executed by the one or more processors, cause the power sourcing equipment (PSE) device to calculating power consumption information for a Power over Ethernet (PoE) powered device (PD); transmitting the power consumption information for the powered device to a network controller; receiving, from the network controller, a predicted threshold for the powered device; and implementing a power consumption policy for the powered device based on the predicted threshold.

Statement 15. The power sourcing equipment (PSE) device of statement 14, wherein the PSE device is configured to provide power and communications to the powered device via a wired connection.

Statement 16. The power sourcing equipment (PSE) device of statements 14-15, wherein the PSE device is a network switch.

Statement 17. The power sourcing equipment (PSE) device of statements 14-16, wherein the power consumption information includes time series data for power consumption of the powered device, and wherein the predicted threshold is based on the power consumption information.

Statement 18. The power sourcing equipment (PSE) device of statements 14-17, wherein the instructions further cause the power sourcing equipment (PSE) device to collect operational data of the PSE; and transmit the operation data to the network controller, wherein the predicted threshold is based on the operational data.

Statement 19. The power sourcing equipment (PSE) device of statements 14-18, wherein operational data comprises at least one of sensors data or data associated computing resources used by the PSE.

Statement 20. The power sourcing equipment (PSE) device of statements 14-19, wherein the instructions further cause the power sourcing equipment (PSE) device to set a consumption threshold for the powered device to the predicted threshold received from the network controller.

Statement 21: A system comprising means for performing a method according to any of statements 1 through 20.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method comprising:
receiving, at a network controller from one or more network fabric edge nodes, operation data for one or more Power over Ethernet powered devices (PDs), wherein the operation data includes at least power consumption information of the one or more PDs and sensor data associated with at least one network fabric edge node of the one or more network fabric edge nodes;
identifying a set of devices based on the operation data for each PD of the one or more PDs;
generating a model based on the power consumption information for the set of devices;
calculating a predicted threshold based on the model; and
transmitting, to the one or more network fabric edge nodes, the predicted threshold for the set of devices, wherein the predicted threshold implements a power consumption policy for at least one of the set of devices on the one or more network fabric edge nodes.

2. The method of claim 1, wherein the power consumption information for the one or more PDs includes powered consumption information associated with a first set of PDs connected to a first power sourcing equipment (PSE) device and powered consumption information associated with a second set of PDs connected to a second power sourcing equipment (PSE) device.

3. The method of claim 2, wherein the one or more network fabric edge nodes include the first PSE device and the second PSE device.

4. The method of claim 1, wherein the model is an AutoRegressive Integrated Moving Average (ARIMA) model.

5. The method of claim 1, wherein the power consumption information of the one or more PDs includes device information for each PD of the one or more PDs.

6. The method of claim 5, wherein the
identifying the set of devices based on the device information for each PD of the one or more PDs; and
wherein the predicted threshold is for the set of devices.

7. The method of claim 6, wherein the set of devices is identified based on a clustering technique.

8. The method of claim 6, wherein the operation data further includes location data associated with a network fabric edge node of the one or more network fabric edge nodes, the method further comprising:
retrieving weather data from a third party service based on the location data; and
wherein the set of devices is identified based on the weather data.

9. The method of claim 1, wherein the one or more PDs include at least one of an Internet Protocol (IP) camera, Voice-over-Internet-Protocol (VoW) phone, or a wireless access point.

10. A non-transitory computer-readable medium comprising instructions that, when executed by one or more processors, cause a computing device to:
receive, from a power sourcing equipment (PSE) device, operation data including at least power consumption information for one or more powered devices (PDs) connected to the PSE device via cabling and sensor data associated with the PSE device;
identifying a set of devices based on the operation data for each PD of the one or more PDs;
calculate a predicted threshold for the set of devices based on the operation data; and
transmit, via a network to the PSE device, the predicted threshold, wherein the PSE device is configured to implement a power consumption policy for at least one of the set of devices based on the predicted threshold.

11. The non-transitory computer-readable medium of claim 10, wherein the predicted threshold is calculated based on an AutoRegressive Integrated Moving Average (ARIMA) model.

12. The non-transitory computer-readable medium of claim 10, wherein the cabling is an Ethernet cable.

13. A power sourcing equipment (PSE) device comprising:
one or more processors; and
at least one non-transitory computer-readable medium having stored therein instructions which, when executed by the one or more processors, cause the PSE device to:
calculating power consumption information for one or more Power over Ethernet powered devices (PDs);
transmitting the power consumption information for the one or more PDs and sensor data associated with the PSE device to a network controller;
receiving, from the network controller, a predicted threshold for a set of devices identified from the power consumption information and the sensor data; and
implementing a power consumption policy for the set of devices based on the predicted threshold.

14. The power sourcing equipment (PSE) device of claim 13, wherein the PSE device is configured to provide power and communications to the one or more PDs via a wired connection.

15. The power sourcing equipment (PSE) device of claim 13, wherein the PSE device is a network switch.

16. The power sourcing equipment (PSE) device of claim 13, wherein the power consumption information includes time series data for power consumption of the one or more PDs.

17. The power sourcing equipment (PSE) device of claim 13, wherein the instructions further cause the power sourcing equipment (PSE) device to:
collect operational data of the PSE; and
transmit the operation data to the network controller, wherein the predicted threshold is based on the operational data.

18. The power sourcing equipment (PSE) device of claim 17, wherein operational data comprises at least data associated computing resources used by the PSE.

19. The power sourcing equipment (PSE) device of claim 13, wherein the instructions further cause the power sourcing equipment (PSE) device to set a consumption threshold for the one or more PDs to the predicted threshold received from the network controller.

20. The power sourcing equipment (PSE) device of claim 13, wherein the power consumption information of the one or more PDs includes device information for each PD of the one or more Power over Ethernet powered devices (PDs).

* * * * *